United States Patent

Ringhoff et al.

[11] Patent Number: 6,030,479
[45] Date of Patent: Feb. 29, 2000

[54] DEVICE AND PROCESS FOR CONSTRUCTING THE CARCASS AND FOR PRESHAPING A HALF-FINISHED (UNVULCANIZED) RUBBER TIRE

[75] Inventors: Hubert Ringhoff, Seelze; Dietrich Lüderwald, Lehrte, both of Germany

[73] Assignee: Continental Aktiengesellschaft, Hannover, Germany

[21] Appl. No.: 08/956,592

[22] Filed: Oct. 23, 1997

[30] Foreign Application Priority Data

Oct. 25, 1996 [DE] Germany .................... 196 44 486

[51] Int. Cl.⁷ .................................................. B29D 30/26
[52] U.S. Cl. .................... 156/133; 156/123; 156/396; 156/414; 156/415
[58] Field of Search ................. 156/123, 133, 156/111, 396, 398, 414, 415, 416

[56] References Cited

U.S. PATENT DOCUMENTS

| | | | |
|---|---|---|---|
| 2,045,545 | 6/1936 | Shook ..................... | 156/133 |
| 2,440,662 | 4/1948 | Frazier . | |
| 3,772,125 | 11/1973 | Leblond ................. | 156/133 |
| 3,862,871 | 1/1975 | Held et al. ............. | 156/415 |
| 3,929,540 | 12/1975 | Held et al. ............. | 156/133 |
| 4,090,909 | 5/1978 | Christie et al. ....... | 156/414 |
| 4,878,983 | 11/1989 | Schadin et al. ....... | 156/415 |

FOREIGN PATENT DOCUMENTS 2245530  1/1992  United Kingdom .

*Primary Examiner*—Geoffrey L. Knable
*Attorney, Agent, or Firm*—Greenblum & Bernstein, P.L.C.

[57] ABSTRACT

Device and process for constructing a carcass and for preshaping an unvulcanized rubber tire includes a preshaping device. An axially adjustable hollow, cylindrical body associated with the preshaping device has a radially outermost surface. An adjustment device capable of adjusting an axial position of the cylindrical body between an operating position and a rest position is provided. A second body having a radially outermost surface is adapted to form a substantially cylindrical, sealed construction surface with the radially outermost surface of the cylindrical body in the operating position. The preshaping device, in the operating position, is positioned axially inside the cylindrical body in a same axial position as the cylindrical body to enable positioning the carcass without the carcass being affected by the preshaping device. The preshaping device, in the rest position, is positioned axially outside the cylindrical body to enable preshaping of tires without the preshaping of the tires being affected by the cylindrical body. The process includes positioning a cylindrical drum surface to at least partially surround a preshaping device, assembling a carcass on the cylindrical drum surface radially outside the preshaping device, sliding at least a part of the cylindrical drum surface to an axial position beyond the preshaping device, and shaping the assembled carcass by using the preshaping device.

17 Claims, 6 Drawing Sheets

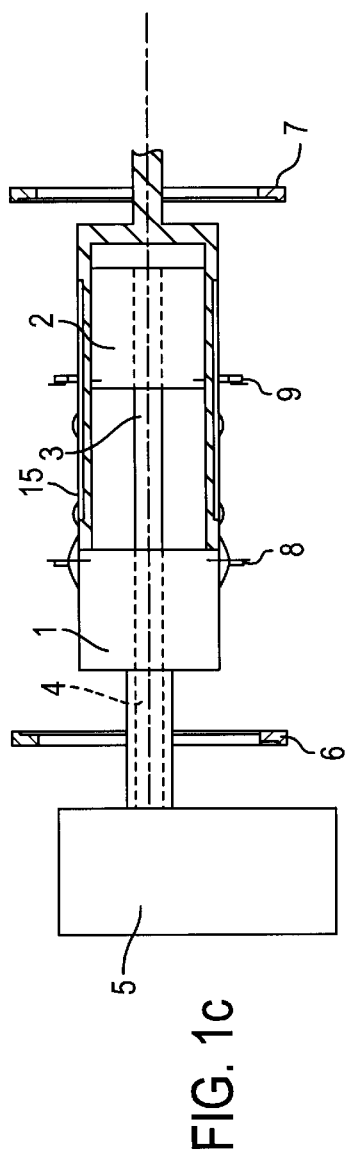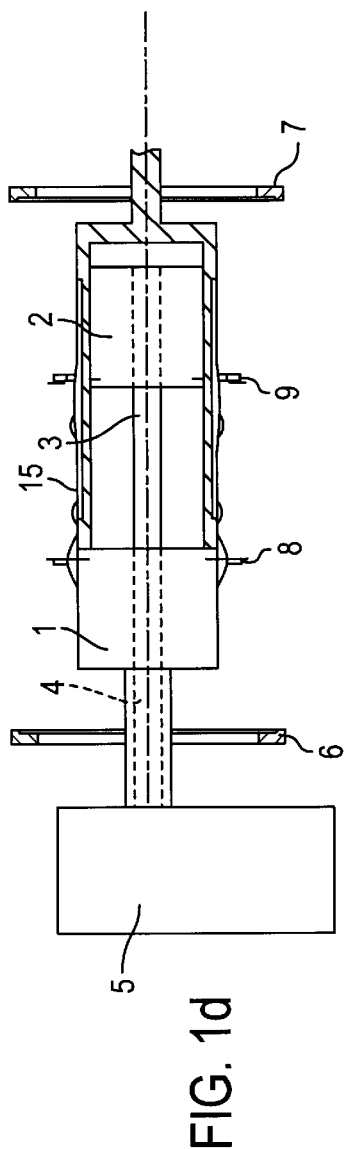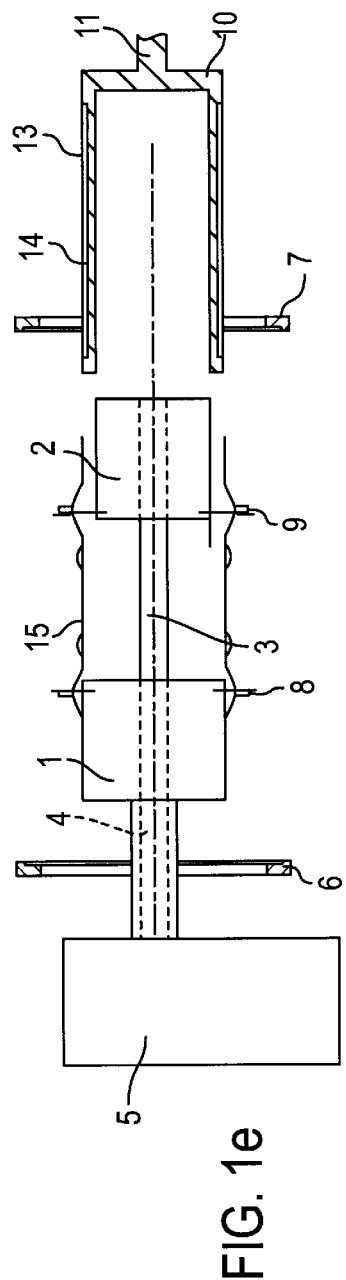

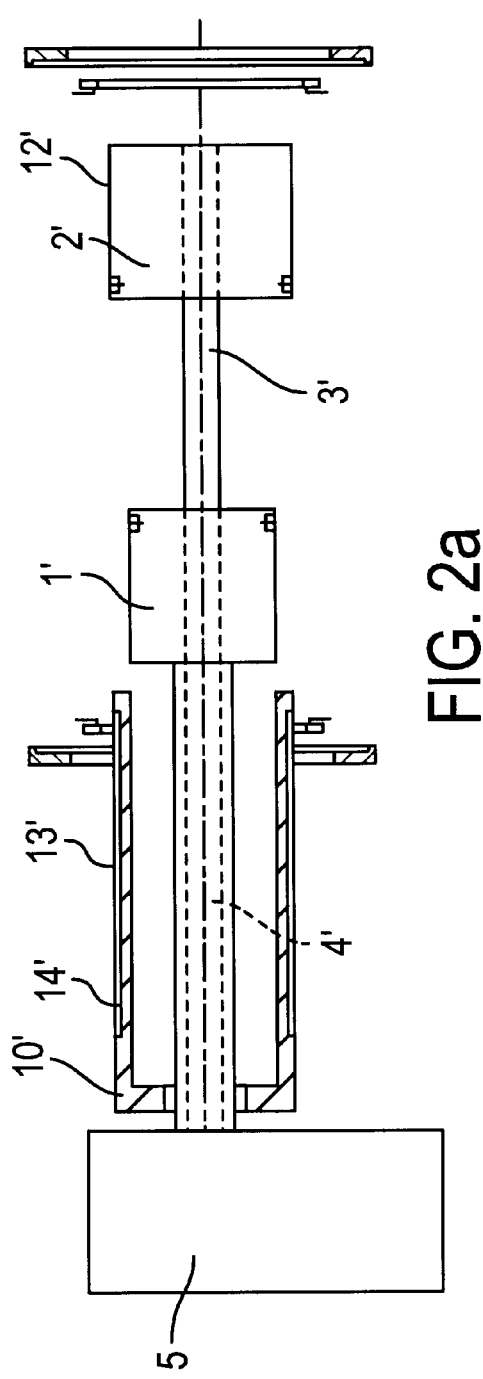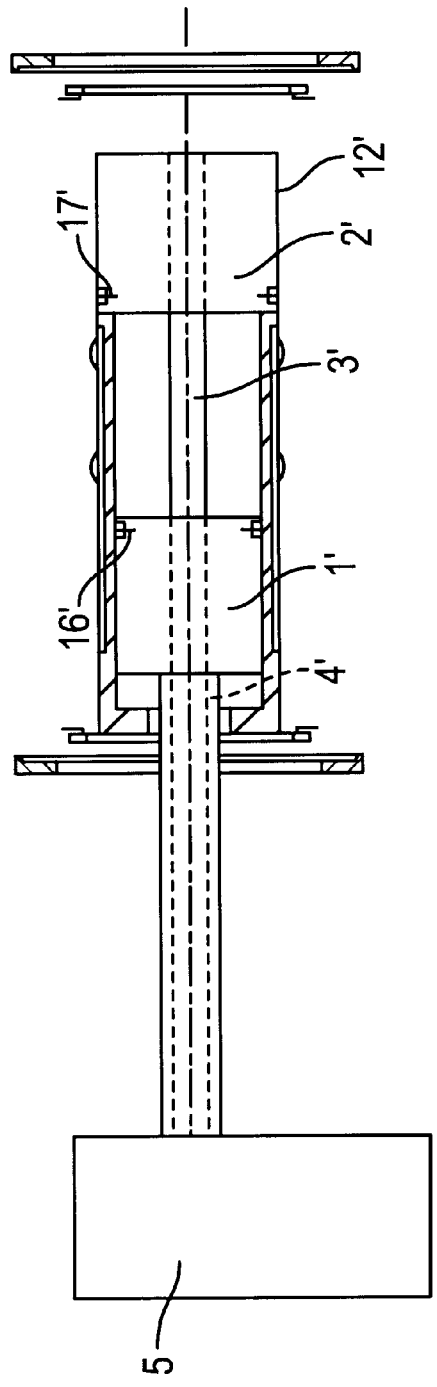

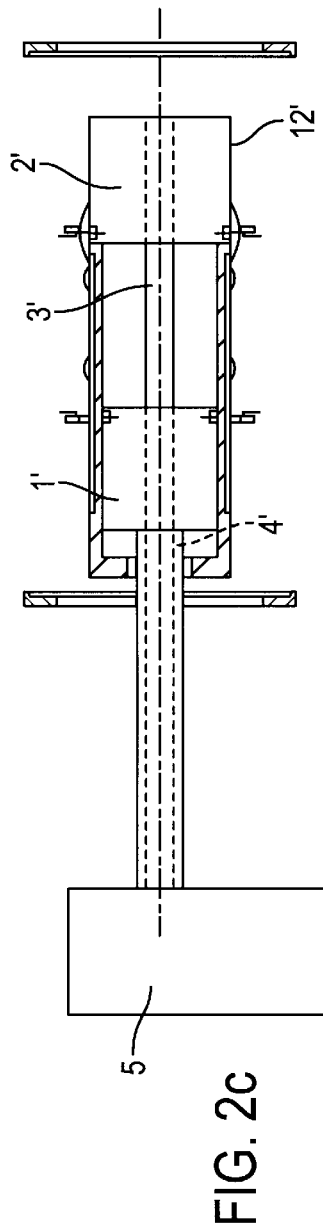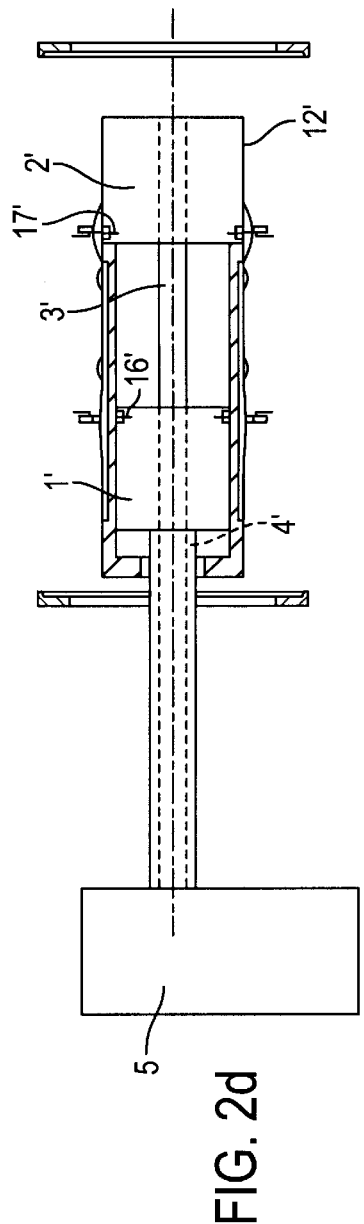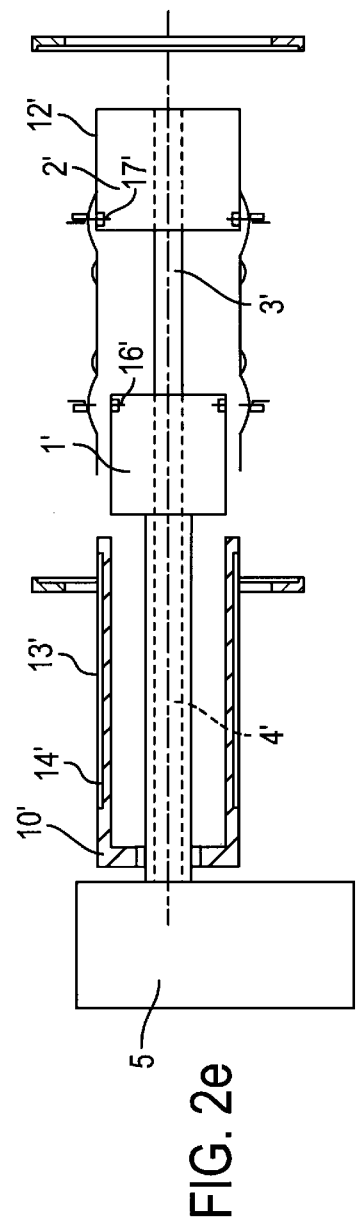

DEVICE AND PROCESS FOR CONSTRUCTING THE CARCASS AND FOR PRESHAPING A HALF-FINISHED (UNVULCANIZED) RUBBER TIRE

CROSS-REFERENCE OF RELATED APPLICATION

The present invention claims the priority under 35 U.S.C. §119 of German Patent Application No. 196 44 486.1 filed on Oct. 25, 1996, the disclosure of which is expressly incorporated by reference herein in its entirety.

BACKGROUND OF THE INVENTION

1. Field of the Invention

The invention relates to a device and a process for constructing a carcass and for preshaping the half-finished (unvulcanized) rubber tire.

2. Discussion of Background Information

The production of vehicle air tires in assembly stations by constructing the carcass package of a tire interior layer, carcass layers and bead cores is known. In another assembly station, the belt package is constructed independently thereof with breaker plies and, if necessary, bindings, treads, and lateral strips. The carcass package is transported to an airbagging machine for the tire shaping and centering. The belt package is also transported to the airbagging machine and positioned concentric to the carcass package in the axial position thereof. The carcass package is radially inflated in the airbagging device, receives the tire body shape, and is joined with the belt package radially from the inside. The carcass construction in this process takes place on an optimized, sealed construction surface of the build-up drum independently of the preshaping requirements. The preshaping takes place in the airbagging device, optimized for the preshaping and independent of the assembly requirements. However, a process of this type is very elaborate. It requires two different assembly stations for the carcass package and the belt package as well as an independent airbagging device for the tire shaping. Aside from the high number of structural elements and the space needed, the carcass package must be transported from the assembly station to the airbagging device. The carcass package can thereby be damaged and must then be centered once again on the airbagging device.

The construction of the carcass layers on a carcass build-up drum that is also constructed as an airbagging device is also known. In these known devices, the middle section of the build-up drum is directly constructed as an airbagging device. After constructing the carcass layers, the middle part of the build-up drum is itself radially expanded for the shaping of the tire so that the assembled carcass package is shaped and receives its body shape.

In order to achieve a roughly cylindrical surface for the construction of the carcass layers, an elaborate mechanism is required in embodiments of this type that causes the heavily segmented cylindrical surface making up the drum elements to follow the expansion. Since during the preshaping of the tire, the beading areas of the half-finished (unvulcanized) rubber tire must be axially moved together for the creation of a tire body shape, a significant mechanical and control effort (pneumatic, electric) must take place at the same time in order to remove the mechanical segments that previously made up the cylindrical construction surface from the middle area, so that the preshaping headers on which the bead cores are axially mounted can be pushed together in this area.

It is also known how to construct the contact surface in this axial area between both preshaping headers with a number of segments at larger distances from each other by which the spatial requirements for axially pushing together the preshaping headers is facilitated, but by which so many empty spaces exist for placement between the individual segments that the surface contour is severely compromised for the placement, whereby the quality of the uniform carcass construction is worsened. The construction surface must therefore accommodate the requirements of the preshaping, for example the ability to expand, at the cost of optimizing the surface for the assembly. The airbagging device becomes very elaborate since it must also satisfy assembly requirements. To make a change in the assembly contour, wide sections of the preshaping device must be replaced.

SUMMARY OF THE INVENTION

The present invention is based on the problem of creating a device and a process for the construction of a carcass of a half-finished (unvulcanized) rubber tire and for the preshaping of the half-finished (unvulcanized) rubber tire, by which the carcass package is realized simply and efficiently, in conjunction with the advantages of tire production with a carcass build-up drum and a separate airbagging device for shaping tires with respect to a favorable drum surface for placing the carcass package and the advantages of the joint construction and preshaping drum, with respect to reducing the construction down to one station.

For the creation of the carcass package both parts of the construction surface are moved together so that they come into contact. The part of the construction surface constructed as a hollow cylindrical body and the other part on its radially exterior, at least essentially cylindrical surfaces, form a sealed construction surface which is individually constructed for optimal placement of the carcass layers of the tires to be produced. The preshaping devices are thereby located radially inside the hollow, cylindrical body without being affected thereby. The preshaping devices therefore affect neither the sealed, cylindrical surface during construction of the carcass package, nor the assembly itself.

After the construction of the carcass package, the cylindrical surface is removed axially outward from the second part making up the construction surface, so that it is placed in a rest position outside the operating area of the preshaping devices. Since preshaping is, therefore, unaffected by the construction surface, the preshaping can take place with optimally designed preshaping devices. The construction of the preshaping devices as well as the preshaping process can take place in accordance with the optimally desired requirements without additional requirements on the construction surface for placement.

Thus, the construction process can take place on a construction device optimized for construction, and the preshaping can take place in the same station with the preshaping devices optimized for preshaping. The construction takes place on a construction surface that is at least essentially sealed for the optimal construction, so that the carcass will be evenly built up. Elaborate mechanisms for releasing the preshaping units making up the construction surface in the central area of the airbagging device can be eliminated. The construction and preshaping thereby take place in a device in which an essentially hollow, cylindrical body is constructed in a slidable manner for the change between the construction process of the carcass package and the preshaping.

To change the surface contour of the build-up drum, for example to construct differently structured tires, it is not necessary to replace the entire airbagging device; rather, only the two parts creating the sealed construction surface must be exchanged.

It is preferable that the hollow, cylindrical part is constructed concentrically to the airbagging device, so that directly after removal of the axially slidable, hollow, cylindrical part, the carcass package is immediately positioned concentric to the airbagging device without renewed centering of the carcass package, and the preshaping can take place immediately without additional centering measures.

Both parts of the essentially cylindrical construction surface are preferably hollow, cylindrical and constructed in a manner axially slidable toward each other, whereby the slide path necessary for the complete clearance of the airbagging device of a part to be moved is minimized. In particular, the embodiment in which the contact is positioned essentially in the axial middle section of the airbagging device enables a symmetrical embodiment of the two parts making up the cylindrical construction surface and a particularly symmetrical assembly of the carcass assembly package to the contact location between both parts in the axial middle area of the carcass assembly package and the preshaping device.

One embodiment of the present invention ensures the reliable separation of the carcass assembly package from the construction surface after the construction of the carcass package through use of bellows, a membrane, or exhaust openings, so that the hollow cylinder can be moved axially out of the carcass package securely and with play. After the construction of the carcass package a medium, for example air, is applied between the bellows or membrane and the hollow cylinder so that the bellows or membrane expands slightly in the axial direction, just enough so that the carcass package is lifted from the build-up drum. After the carcass is lifted, the carcass package can be held in place, for example by known core mounting devices that fasten the bead cores. After removing the medium from the area between the bellows and build-up drum, the hollow cylinder can be axially removed to the carcass with radial play so that the preshaping of the carcass package can take place with the aid of the preshaping devices.

In an embodiment of the device of the present invention, a device for constructing a carcass and for preshaping an unvulcanized rubber tire includes a preshaping device. A hollow, cylindrical body is associated with the preshaping device, the cylindrical body having a radially outermost surface, wherein a position of the cylindrical body is axially adjustable. An adjustment device is provided capable of adjusting an axial position of the cylindrical body between an operating position and a rest position. A second body having a radially outermost surface is adapted to form a substantially cylindrical, sealed construction surface with the radially outermost surface of the cylindrical body in the operating position. The preshaping device, in the operating position, is positioned axially inside the cylindrical body in a same axial position as the cylindrical body to enable positioning the carcass without the carcass being affected by the preshaping device. The preshaping device, in the rest position, is positioned axially outside the cylindrical body to enable preshaping of tires without the preshaping of the tires being affected by the cylindrical body.

In accordance with a further embodiment of the invention, the cylindrical body is concentrically arranged with the preshaping device.

According to a further embodiment of the invention, the cylindrical body and the second body include hollow, cylindrical elements that are axially slidable. The invention further includes a sliding mechanism capable of axially sliding the cylindrical body and the second body relative to each other into the rest position and the operating position. In the operating position, the cylindrical body and the second body are in contact with each other to form the substantially cylindrical, sealed construction surface. A position of the contact corresponds to an axial center position of the preshaping device.

In a further embodiment of the invention, the cylindrical body includes bellows on the radially outermost surface for loosening the carcass.

In another further embodiment of the invention, the cylindrical body includes a membrane on the radially outermost surface for loosening the carcass.

In still another further embodiment, the cylindrical body includes at least one exhaust opening for loosening the carcass.

In a further embodiment of the invention, the second body includes bellows on the radially outermost surface for loosening the carcass.

In another further embodiment of the invention, the second body includes a membrane on the radially outermost surface for loosening the carcass.

In still another further embodiment, the second body includes at least one exhaust opening on the radially outermost surface for loosening the carcass.

According to the invention, a process for constructing a carcass and for preshaping an unvulcanized rubber tire includes positioning a cylindrical drum surface to at least partially surround a preshaping device, assembling a carcass on the cylindrical drum surface radially outside the preshaping device, sliding at least a part of the cylindrical drum surface to an axial position beyond the preshaping device, and shaping the assembled carcass by using the preshaping device.

Further in accordance with the process, the assembled carcass is shaped after the at least a part of the cylindrical drum surface is slid to an axial position beyond the preshaping device.

BRIEF DESCRIPTION OF THE DRAWINGS

The invention is described in the following in more detail with the aid of the embodiments illustrated in the accompanying Figures, wherein:

FIGS. 1a–1e shows a schematic illustration of a method for constructing and preshaping with a slidable hollow cylinder;

FIGS. 2a–2e shows a schematic illustration for the construction of a carcass package and for the preshaping in a second embodiment with a slidable hollow cylinder.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1A:
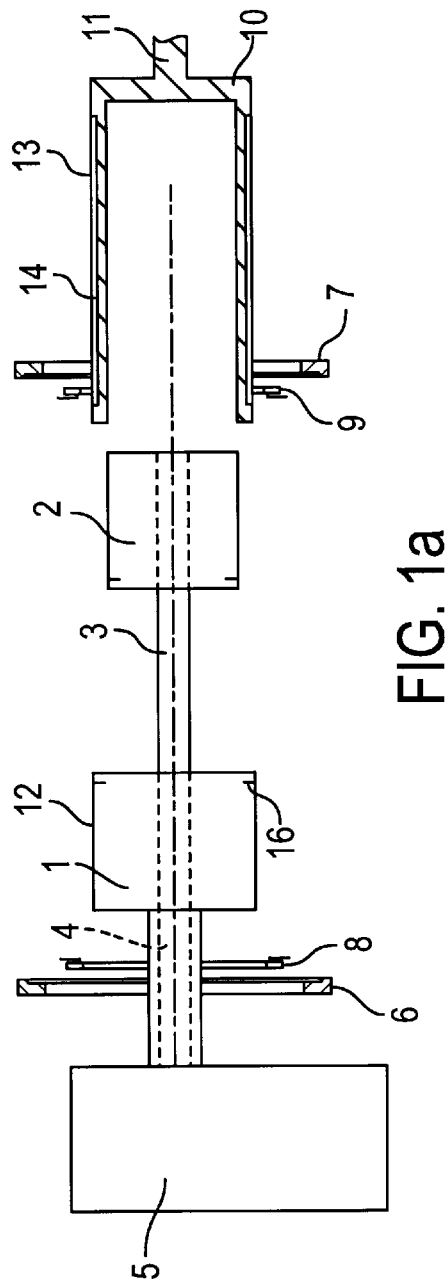
Figure 1B:
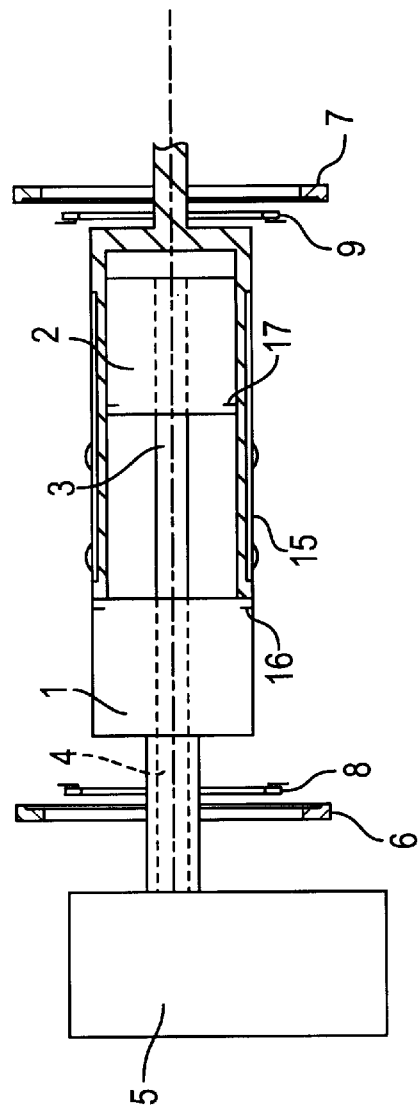

FIGS. 1a–1e show schematically a carcass package construction- and airbagging device in accordance with the invention with a left preshaping header 1 and a right preshaping header 2, whereby the preshaping header 2 is positioned in an axially slidable manner in the machine 5 over an axially slidable shaft 3 in a known manner, and preshaping header 1 is positioned concentric to axis 3 such that the preshaping header 1 can rotate over a hollow shaft 4 and slide axially. The hollow cylinder 10 is joined concentrically to the axis 3 over a shaft 11 to an apparatus, not shown here, that is connected with the machine 5 and which can rotate and slide axially. The hollow cylinder 10 is constructed on its outer cylindrical surface toward the essentially cylindrical construction surface 13, and the left preshaping header 1 is constructed with its cylindrical surface toward the essentially cylindrical construction surface 12. The diameters of the construction surface 12 and the construction surface 13 are of equal size. The outer diameter of the right preshaping header 2 is chosen so small so that the hollow cylinder 10, as illustrated in FIGS. 1b to 1d, can be pushed axially over the right preshaping header 2 without play.

Located between the left preshaping header 1 and the right preshaping header 2 is a conventional preshaping bellows for preshaping the carcass in a known manner, not shown here for the sake of simplicity, which extends axially over the space between the two preshaping headers.

For constructing the carcass package the hollow cylinder 10 is pushed from its rest position outside the right preshaping header 2, as illustrated in FIG. 1a, over the right preshaping header 2, so that the left face surface of the hollow cylinder 10, as illustrated in FIG. 1b, comes in contact with the right face surface of the left preshaping header 1. Preshaping header 1 and hollow cylinder 10 with their construction surfaces 12 or 13 make up an axially and circumferentially sealed, essentially cylindrical surface. The carcass package 15 is constructed on this surface in a known manner. It is also conceivable to rotate the left preshaping header 1 by turning the hollow shaft 4 and the hollow cylinder 10 by a synchronized turning of the shaft 11 to thereby place the structural bands for the construction of the individual layers of the carcass package onto the surface.

Due to the synchronized rotation of the two shafts with equal angular velocity a sealed layer spanning the circumference is constructed in a known manner. It is also conceivable, for example, to construct an inner layer of air-impermeable rubber material as the radially innermost layer, and over it place one or more carcass layers of conventional, parallel, rigid carriers imbedded in rubber material. The carcass layers can be of a radial construction type. It is also conceivable to construct carcass layers of a diagonal construction type in this manner.

As illustrated in FIG. 1c, the premanufactured tire cores are then moved in a known manner into their intended positions in the carcass package with the core positioning devices 8, 9. As illustrated in FIG. 1c, the core clamping devices 16 of known design that are radially movable and spaced across the circumference on the left preshaping header are then moved radially outward so that they press the carcass package against the core positioned by the core positioning device 8 and clamp the core concentrically.

After that the bellows 14, as illustrated in FIG. 1d, created on the surface 13 of the hollow cylinder 10 and extending over its circumference, is inflated by the addition of pressurized air between the bellows 14 and the hollow cylinder so that the carcass package is slightly expanded radially in the area of the hollow cylinder 10. After venting the bellows, a small play between carcass package 15 and hollow cylinder 10 is created due to the expansion. The hollow cylinder 10, as illustrated in FIG. 1e, is pulled axially outward under the carcass into its rest position without play. The core clamping devices 17, constructed radially movable and spaced evenly across the circumference of the right preshaping header 2, are moved radially outward, press the carcass against the core held by the core positioning device 9, and clamp them in concentrically.

As with an independent airbagging device, the preshaping bellows (not illustrated) is clamped between the left and right preshaping headers 1 and 2 and is pressurized with an interior pressure so that the preshaping bellows inflates to thereby expand the carcass package. At the same time the left preshaping header 1 is moved over shaft 4 and the right preshaping header 2 is moved over shaft 3 evenly and axially toward the middle so that the bead cores are moved axially toward each other. The carcass package body shape is hereby constructed in a known manner.

By means of known aid devices, for example with the aid of bellows and pressure rings 6 and 7, the carcass layer ends that axially stick out of the core beads can be folded radially upward after the removal of the core positioning devices 8, 9 and can be pressed against the body.

After the pressure drop in the interior of the preshaping bellows or the carcass, the core clamping devices are released, the preshaping headers are moved apart, and the body is removed axially to one side.

It is conceivable, after the removal of the hollow cylinder 10, to axially slide the belt package, constructed independently from the carcass package and comprising breaker plies, bindings, treads, and the two side strips, over the exterior of the carcass package in a known manner and then to join the carcass package with the belt package by the preshaping process described above. For this purpose the hollow cylinders, the right core positioning device and the pressure ring on the free shaft end of the machine are first retracted perpendicular to the machine axis.

It is conceivable, as described, to perform the preshaping of the carcass with the aid of a preshaping bellows. It is also conceivable to directly pressurize the carcass with interior pressure without preshaping bellows, for example with pressurized air, for the preshaping of the tire.

It is also conceivable to design a suitable membrane instead of the inflating bellows 14 or, for the separation of the carcass package from the hollow cylinder 10, merely to blow air between the carcass package and the hollow cylinder 10, for example with exhaust openings in the surface 13. It is equally conceivable, as long as the friction between the carcass material and the surface 13 of the hollow cylinder 10 is not too great, to axially pull the hollow cylinder 10 from the carcass clamped between the clamping device 16 and the core after the clamping of the carcass package between the core clamping device 16 and the corresponding core.

FIGS. 2a–2e show an alternative embodiment in which the hollow cylinder 10' is not inserted from the side opposite to the machine 5 as in FIGS. 1a–1e, but from the machine side in a space saving manner. The hollow cylinder 10' with its outer surface makes up the construction surface 13' and is constructed with bellows 14'. The outer diameter of the construction surface 13' corresponds to the outer diameter of the surface 12' of the right preshaping header 2'. The outer diameter of the left preshaping header 1' is constructed such that the hollow cylinder 10' can be moved over the left preshaping header 1'. With the exception of the hollow cylinder 10' in its rest position between the machine and the left preshaping header 1', as illustrated in FIG. 2a, and moved into its operating position from left to right, as illustrated in FIGS. 2b to 2d, the fundamental set-up and method of functioning essentially corresponds to that in FIGS. 1b to 1d. It can be seen in FIG. 2b how the carcass package 15 is placed. FIG. 2c shows how the core clamping devices 17' clamp the carcass package and the corresponding core together. FIG. 2d shows how the inflating bellows 14' is inflated for loosening the seat of the carcass and hollow cylinder 10'. FIG. 2e shows the carcass package clamped between the core clamping devices 16' and 17' and the corresponding cores, and the hollow cylinder 10' is moved into the rest position.

Figure 3A:
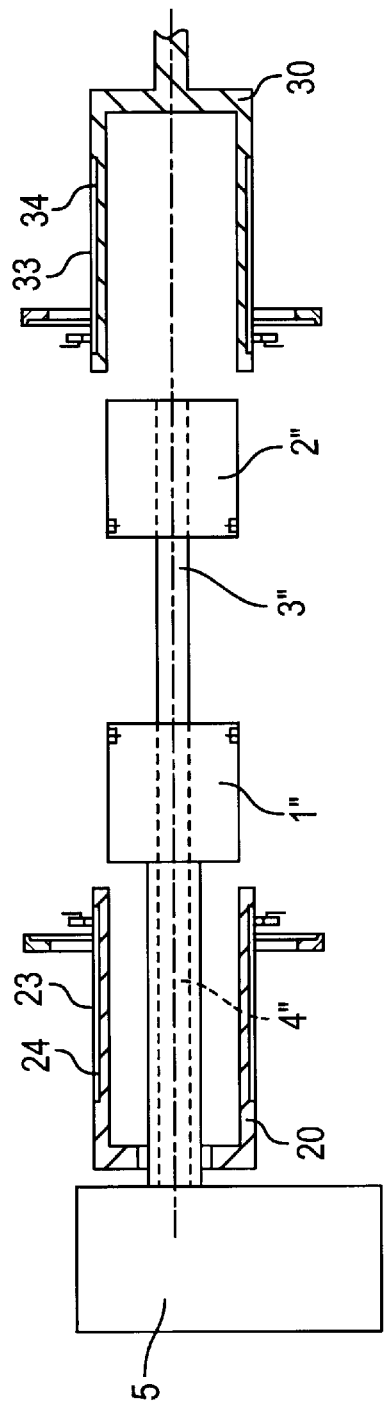
FIGS. 3a–3d shows an embodiment with two slidable hollow cylinders.
Figure 3B:
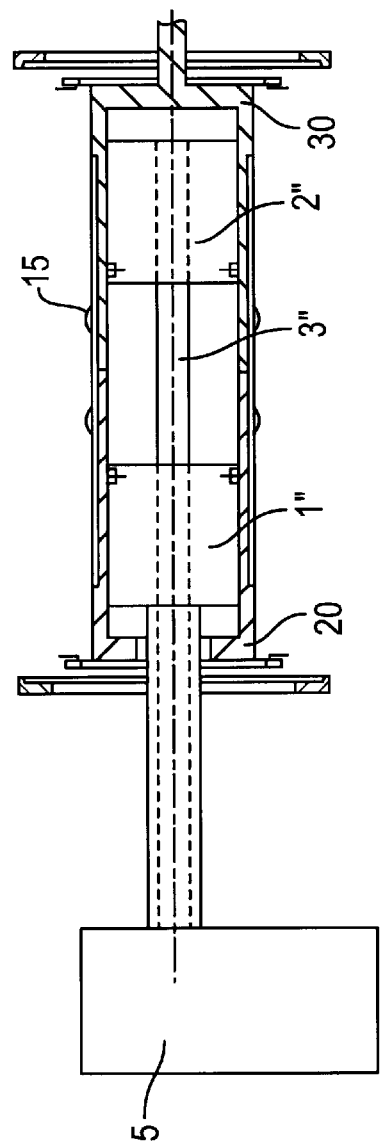
Figure 3C:
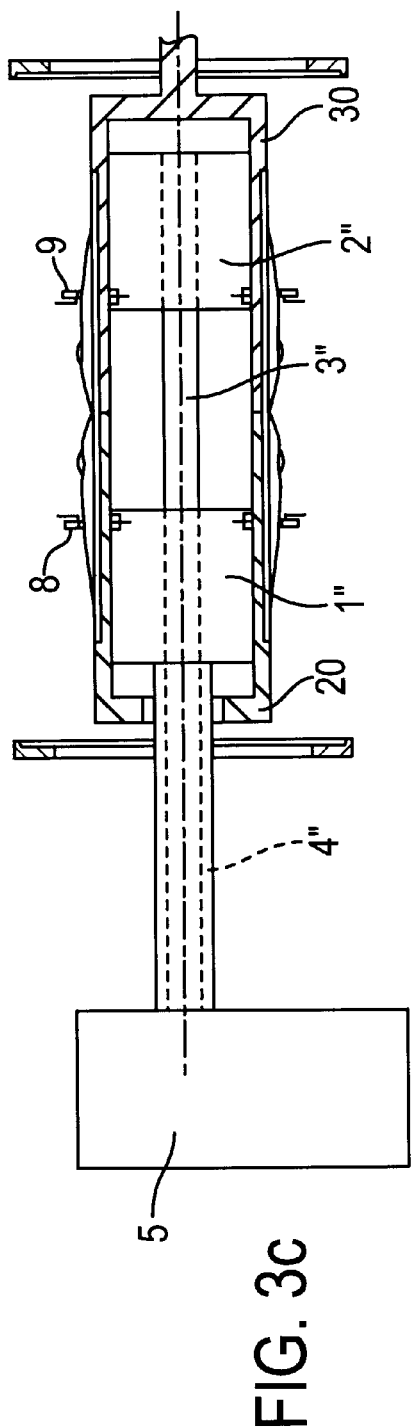
Figure 3D:
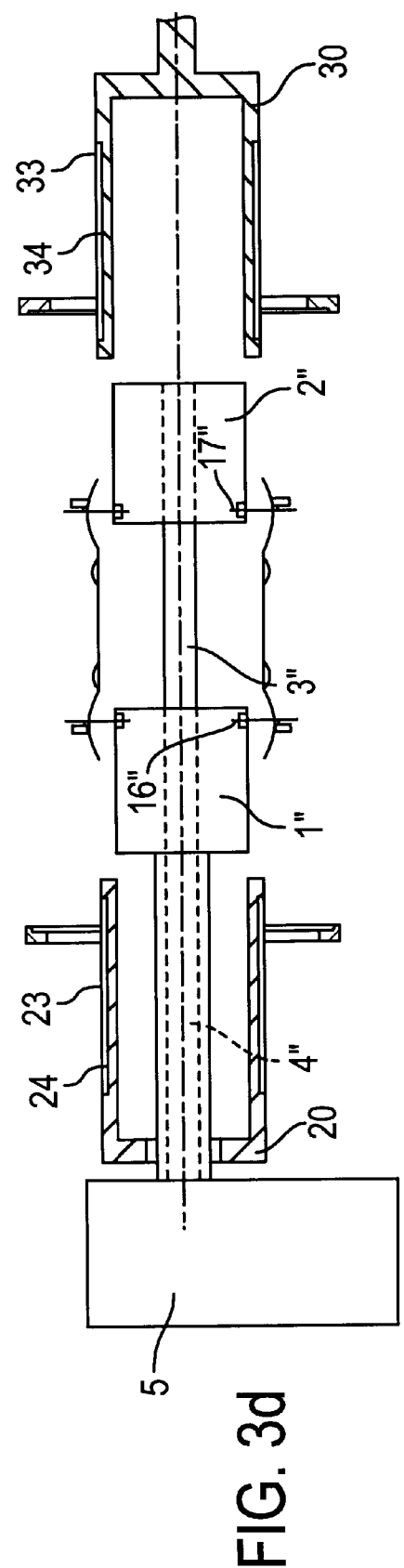

FIGS. 3a–3d show an embodiment with two hollow cylinders 20 and 30 whose outer contours are designed symmetrically to each other and whose outer cylinder surface create the construction surfaces 23 and 33. The left preshaping header 1" and the right preshaping header 2" are constructed with an outer diameter of the same size. FIG. 3a shows the two hollow cylinders in the rest position. For the construction of the carcass layers, the two hollow cylinders 20 and 30 are axially pushed together so that their face surfaces come into contact, pointed toward each other in between the preshaping headers 1" and 2". The construction surfaces 23 and 33 are constructed with the same diameter and make up a sealed, essentially cylindrical surface. On this, as illustrated in FIG. 3b, the carcass package 15 is constructed in a known manner. With the aid of the inflating bellows 24 and 34, the carcass package is not only loosened, but the carcass package 15 is pressed against both cores. As shown in FIG. 3c, the carcass pressed against the cores is fixed in its position by the core positioning devices 8 or 9 so that after the release of the bellows 24 or 34, the two hollow cylinders 20 and 30 can be axially moved apart until they reach the rest position. After the two hollow cylinders 20 and 30 are axially moved apart, the core tensioning devices 16" and 17" are moved radially outward and clamp the carcass and the core concentrically, as shown in FIG. 3d. The preshaping takes place in the manner described in, e.g., FIG. 1e.

It is also conceivable to initially inflate only one of the two bellows 24 or 34, for example the bellow 24, to loosen the carcass. Some play results hereby between the carcass and the hollow cylinder 20, while the carcass package still adheres to the hollow cylinder 30. The hollow cylinder 20 can be axially moved into its rest position without play, while the carcass package is held by the hollow cylinder 30. In another step the core clamping devices 16" are moved axially outward so that they clamp the carcass and the core concentrically. Only then is the carcass released from the hollow cylinder 30 by inflating the bellows 34. After venting the bellows 34 the hollow cylinder 30 is also moved axially into its rest position. Afterward, the core clamping devices 17" are moved radially outward until they clamp the carcass package and the corresponding core.

It is conceivable to construct the cylindrical construction surfaces 12, 13, 12', 13', or 23, 33 in a contoured fashion corresponding to the requirement of an optimal application of the carcass package. To change the respective, individually desired contour, for example to change the tire to be produced, it is sufficient to replace the hollow cylinders or preshaping headers exhibiting the construction surfaces 12, 13, 12', 13', 23, 33 with correspondingly contoured ones. The change is particularly easy in the embodiment in FIGS. 3a–3d, since only the hollow cylinders 20 or 30, which have a simple mechanical construction, must hereby be replaced. In the embodiments of FIGS. 1a–1e and 2a–2e it may also be sufficient in many cases merely to change the hollow cylinders, since they already contain a wide axial area and in particular the central axial area of the tire assembly contour.

Also in the embodiments of FIGS. 2a–2e and 3a–3d it is conceivable to construct suitable membranes instead of inflating bellows, or to blow air through exhaust openings in the cylindrical surfaces for the separation.

It is equally conceivable to directly pressurize the carcass with interior pressure without preshaping bellows, for example with pressurized air, for preshaping the tire.

In all embodiments it is also conceivable, if necessary for safe separation, to construct inflating bellows or suitable membranes and additionally blow separating air between the carcass and the cylindrical surface.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and the spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

REFERENCE LIST

1 Left Preshaping Header
2 Right Preshaping Header
3 Axis
4 Hollow Shaft
5 Machine
6 Pressure Rings
7 Pressure Rings
8 Core Positioning Devices
9 Core Positioning Devices
10 Hollow Cylinder
11 Shaft
12 Construction Surface
13 Construction Surface
14 Bellows
15 Carcass Package
16 Core Clamping Device
17 Core Clamping Device
20 Hollow Cylinder
23 Construction Surface
24 Bellows
30 Hollow Cylinder
33 Construction Surface
34 Bellows

What is claimed:
1. A device for constructing a carcass and for preshapinig an unvulcanized rubber tire, comprising:
   a first cylindrical preshaping device;
   a cylindrical drum associated with the first cylindrical preshaping device, the cylindrical drum having a radially outermost surface;

an adjustment device capable of adjusting, an axial position of the cylindrical drum between an operating position and a rest position;

a second cylindrical preshaping device having a radially outermost surface which is capable of forming a substantially cylindrical, sealed construction surface with the radially outermost surface of the cylindrical drum in the operating position, the second cylindrical preshaping device being axially moveable relative to the first cylindrical preshaping device during preshaping;

the first cylindrical preshaping device, in the operating position, being positioned in an axial position which is radially inside the cylindrical drum in a same axial position as the cylindrical drum to enable positioning of the carcass without the carcass being affected by the first cylindrical preshaping device; and the first cylindrical preshaping device, in the rest position, being positioned in an axial position which is outside the cylindrical drum to enable preshaping of tires without the preshaping of the tires being affected by the cylindrical drum.

2. The device of claim 1, the cylindrical drum being concentrically arranged with the first cylindrical preshaping device.

3. The device of claim 1, the cylindrical drum comprising one of a bellows and a membrane on the radially outermost surface for loosening the carcass.

4. The device of claim 1, the cylindrical drum comprising at least one exhaust opening for loosening the carcass.

5. The device of claim 1, the first cylindrical preshaping device being capable of rotating.

6. The device of claim 1, the first cylindrical preshaping device being capable of sliding axially.

7. A device for constructing a carcass and for preshaping an unvulcanized rubber tire, comprising:

a first cylindrical preshaping device;

a second cylindrical preshaping device associated with the first cylindrical preshaping device;

a first cylindrical drum associated with the first cylindrical preshaping device, the first cylindrical drum having a radially outermost surface;

a second cylindrical drum associated with the second cylindrical preshaping device, the second cylindrical drum having a radially outermost surface, the second cylindrical preshaping device being axially moveable relative to the first cylindrical preshaping device during preshaping;

an adjustment device capable of adjusting an axial position of the first cylindrical drum and second cylindrical drum between an operating position and a rest position;

the radially outermost surface of the second cylindrical drum being capable of forming a substantially cylindrical, sealed construction surface with the radially outermost surface of the first cylindrical drum in the operating position;

the first cylindrical preshaping device, in the operating position, being positioned in an axial position which is radially inside the first cylindrical drum in a same axial position as the first cylindrical drum to enable positioning of the carcass without the carcass being affected by the first cylindrical preshaping device;

the first cylindrical preshaping device, in the rest position, being positioned in an axial position which is outside the first cylindrical drum to enable preshaping of tires without the preshaping of the tires being affected by the first cylindrical drum;

the second cylindrical preshaping device, in the operating position, being positioned in an axial position which is radially inside the second cylindrical drum in a same axial position as the second cylindrical drum to enable positioning of the carcass without the carcass being affected by the second cylindrical preshaping device; and the second cylindrical preshaping device, in the rest position, being positioned in an axial position which is outside the second cylindrical drum to enable preshaping of tires without the preshaping of the tires being affected by the second cylindrical drum.

8. The device of claim 7, the first cylindrical drum being concentrically arranged with the first cylindrical preshaping device.

9. The device of claim 7, the second cylindrical drum being concentrically arranged with the second cylindrical preshaping device.

10. The device of claim 7, the first cylindrical drum and second cylindrical drum each comprising one of a bellows and a membrane on their radially outermost surfaces for loosening the carcass.

11. The device of claim 7, the first cylindrical drum and second cylindrical drum each comprising at least one exhaust opening for loosening the carcass.

12. The device of claim 7, the first cylindrical preshaping device being capable of rotating.

13. The device of claim 7, the second cylindrical preshaping device being capable of rotating.

14. The device of claim 7, the first cylindrical preshaping device being capable of sliding axially.

15. The device of claim 7, the first cylindrical drum and the second cylindrical drum being axially slidable, and the device further comprising a sliding mechanism capable of axially sliding the first cylindrical drum and the second cylindrical drum relative to each other into the rest position and the operating position, wherein in the operating position the first cylindrical drum and the second cylindrical drum are in contact with each other to form the substantially cylindrical, sealed construction surface, and wherein a position of the contact corresponds to an axial center position of the first cylindrical preshaping device and second cylindrical preshaping device.

16. A process for constructing a carcass and for preshaping an unvulcanized rubber tire, comprising:

positioning a cylindrical drum to at least partially surround a first cylindrical preshaping device which is capable of rotation, and contacting the cylindrical drum with a second cylindrical preshaping device to form a substantially cylindrical construction surface which is radially outside the first cylindrical preshaping device;

assembling a carcass on the construction surface;

sliding at least a part of the cylindrical drum to an axial position beyond the first cylindrical preshaping device; and shaping the assembled carcass by using the first cylindrical preshaping device and the second cylindrical preshaping device, the first cylindrical preshaping device and the second cylindrical preshaping device being axially moved during the shaping.

17. A process for constructing a carcass and for preshapinig an unvulcanized rubber tire, comprising:

positioning a first cylindrical drum and a second cylindrical drum to at least partially surround a first cylindrical preshaping device and a second cylindrical preshaping device, and contacting the first cylindrical drum with the second cylindrical drum to form a substantially cylindrical construction surface which is radially outside the first cylindrical preshaping device and the second cylindrical preshaping device;

assembling a carcass on the construction surface;

sliding at least a part of the first cylindrical drum to an axial position beyond the first cylindrical preshaping device;

sliding at least a part of the second cylindrical drum to an axial position beyond the second cylindrical preshaping device; and shaping the assembled carcass by using the first cylindrical preshaping device and the second cylindrical preshaping device, the first cylindrical preshaping device and the second cylindrical preshaping device being axially moved during the shaping.

* * * * *